C. E. TITUS.
PROTECTIVE TREAD FOR PNEUMATIC TIRES.
APPLICATION FILED SEPT. 14, 1908.
973,999.
Patented Oct. 25, 1910.
2 SHEETS—SHEET 2.
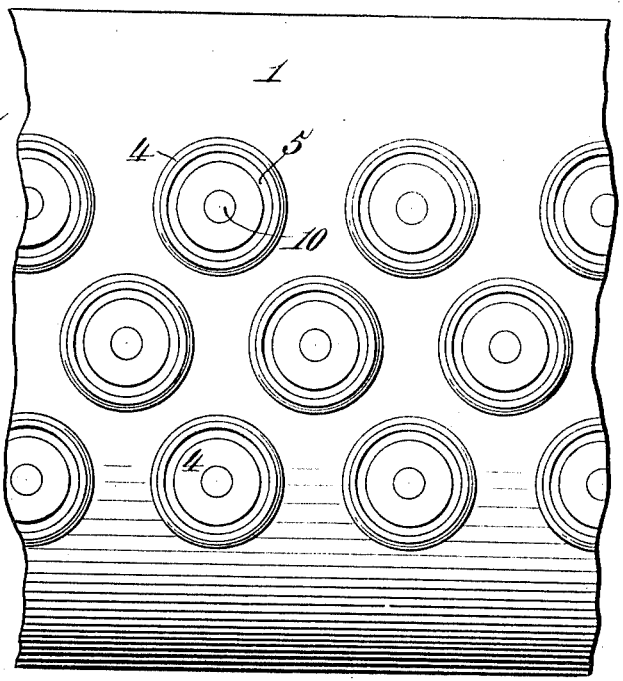
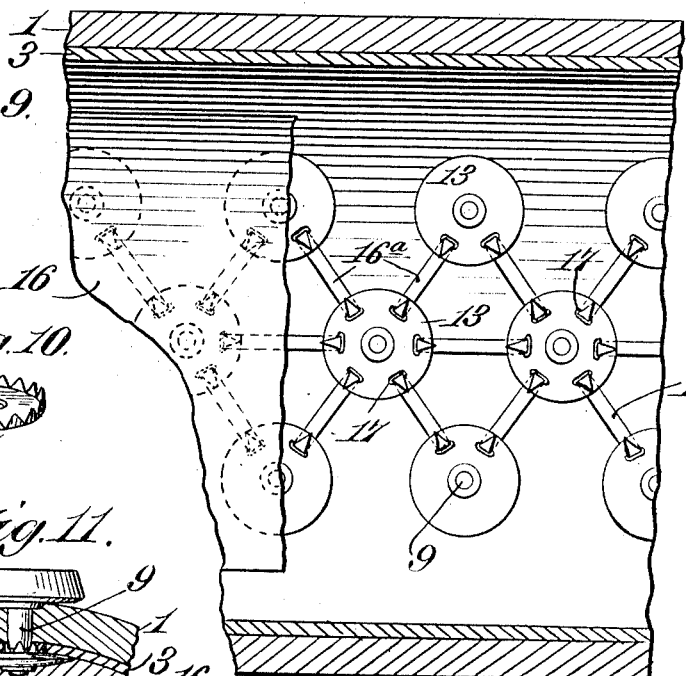
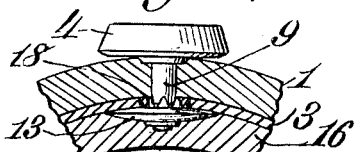

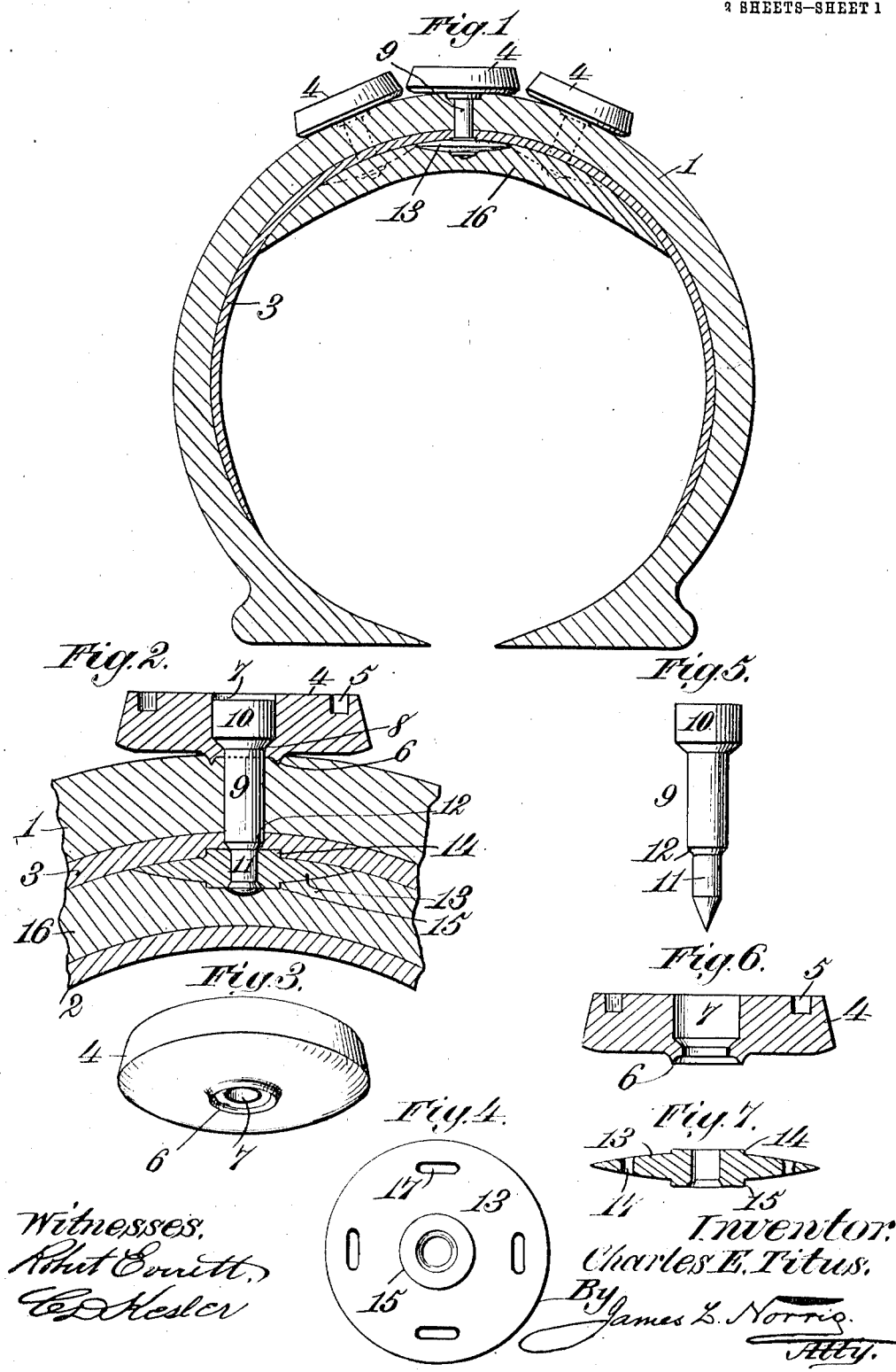

UNITED STATES PATENT OFFICE.

CHARLES E. TITUS, OF SPRINGFIELD, MASSACHUSETTS.

PROTECTIVE TREAD FOR PNEUMATIC TIRES.

973,999.  Specification of Letters Patent.  Patented Oct. 25, 1910.

Application filed September 14, 1908. Serial No. 452,942.

*To all whom it may concern:*

Be it known that I, CHARLES E. TITUS, a citizen of the United States, residing at Springfield, in the county of Hampden and State of Massachusetts, have invented new and useful Improvements in Protective Treads for Pneumatic Tires, of which the following is a specification.

My present invention relates to improvements in protective treads for pneumatic tires whereby the life of the tire is increased, the liability of puncturing is minimized and the traction of the tires is increased while skidding is prevented, and it has for its object primarily to provide an improved tread of this character which is composed of a set of heads, preferably of hardened metal, and disposed suitably upon the tire tread, these hardened heads being held in place by relatively soft metal pins which extend through the outer tire casing and are secured at their inner ends by means of washers, the head-securing pins being provided with shoulders to receive the axial thrust of the washers and thereby prevent undue pinching of the tire casing between the tread heads and the washers.

Another object of the invention is to provide a tread head of novel construction, the ground-engaging surface of the head being provided with an annular groove which is adapted to receive the point of a nail or other sharp object and thereby prevent its slipping over the edge of the tread head and puncturing the tire, the head being also provided at its inner side with an annular rib which is arranged to engage the outer surface of the tire casing and thereby prevent the entrance of water or sand into the tire.

Another object of the invention is to provide an improved tire construction in combination with the protective tread, the inner surface of the tire casing being lined preferably with chrome-tanned leather, and after the application of the washers, a soft rubber cushion is applied over the said lining and the washers whereby the air tube of the tire is protected from abrasion, the washers being interposed between the lining and cushion and having anchoring projections which extend from their inner and outer surfaces and coöperate, respectively, with the leather lining and the rubber cushion, thereby securing the washer from side strain or tilting.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a transverse section of a pneumatic tire provided with a protective tread constructed in accordance with my present invention; Fig. 2 represents a section taken in the plane of the tire showing one of the tread elements on an enlarged scale; Fig. 3 is a perspective view of one of the tread heads; Fig. 4 is a plan view of one of the washers; Fig. 5 is a detail view of the pin for uniting the head and washer; Figs. 6 and 7 represent axial sections of the tread head and washer, respectively; Fig. 8 is a top plan view of a portion of the tire casing equipped with the tread; Fig. 9 represents a section of the tire showing the means for anchoring together the washers of the various tread elements; Fig. 10 is a perspective of a spurred washer; and Fig. 11 is a sectional view showing the manner of applying such washer to the tread element and tire.

Similar parts are designated by the same reference characters in the several views.

Protective treads constructed in accordance with my present invention are capable of application generally to tires of various constructions, although they are particularly applicable to pneumatic tires of the type used upon automobiles. In the present instance, I have shown the invention applied to a pneumatic tire of the ordinary detachable type comprising an outer casing 1 and the inner or air tube 2.

According to my present invention, I line the interior surface of the outer casing with a strip of chrome-tanned leather 3 which may be cemented or otherwise secured in position, the toughness of this lining serving to securely hold the tread elements from pulling through or wearing the tire casing. In the present instance, I preferably employ a plurality of tread elements which are independently yieldable so as to insure the maximum resilience, three longitudinal rows of tread elements being illustrated in the drawing which number is shown as an example, although it is obvious that the number of tread elements may be varied as desired. Each tread element consists of a head 4 which is preferably disk-like or annular in general form and is preferably composed of hardened steel or other appropriate material. The outer surface of this head which is adapted to engage the ground is provided with an annular groove 5 which encircles the disk adjacent to its periphery, this groove serving to receive the points of nails or other relatively sharp objects and thereby prevent them from slipping over the edge of the head and thus puncturing the tire. The under side of each head is rounded at its edge so as to prevent abrasion of the tire casing and is also provided with an annular rib 6 which is adapted to embed itself for a suitable distance in the tire casing and thus prevent the entrance of water, sand or other material into the tire through the hole for the securing pin. The head is provided with a bore 7 which is contracted as it approaches the under side of the head so as to provide a shoulder 8. The pin 9 which secures each head to the tire casing has a head 10 which is forced into the bore 7 of the head and constitutes a shoulder which coöperates with the shoulder at the bottom of said bore, thus preventing detachment of the head. The body portion of this pin passes through the tire casing, and in order to facilitate the application of these pins, they are originally pointed, as shown in Fig. 5, and toward this point is formed a reduced portion 11, a shoulder 12 being formed between this reduced portion and the body of the pin. These pins are also passed through the lining 3 of the casing, and a washer 13 is applied to the reduced portion 11 of each pin, the washer abutting against the shoulder 12 of the pin and being secured to the pin by heading over the point of the latter. This washer is of substantially double convex form, one of its surfaces having a projection 14 thereon which is adapted to embed itself in the leather lining 3, and the other surface having a similar projection 15 formed thereon which embeds itself in a cushion 16 preferably of soft rubber which is applied at the inner side of the leather lining after the washers have all been applied, these projections on the washer serving to sustain side strains upon the heads due to striking stones and other objects. This soft rubber cushion may be cemented or vulcanized in place and engages the inner air tube of the tire which it protects from the washers.

In order to further secure the tread elements thus constructed from lateral strains or tilting, I preferably employ anchoring devices, those shown in the present instance consisting of links 16ª, the ends of which enter apertures 17 formed in adjacent washers, these links being composed preferably of flat lengths of bendable metal, the ends of which are hook-shaped, and they extend radially between adjacent washers so that strains bearing upon one of the tread elements tending to deflect such element laterally will be reinforced through these anchoring links.

A protective tread constructed in accordance with my present invention may be manufactured cheaply and applied to tires of various kinds with facility, and in practice, it serves to increase the durability of the tire, minimize puncturing and increase the traction of the wheels, enabling the wheels to obtain a firm hold upon the road and prevent skidding. By interposing the washers of the tread elements between a tough leather lining of the casing and a rubber cushion, abrasion of the casing and air tube is prevented while the security of the hold is increased, and the anchoring projections upon the washers sustain lateral strains imposed upon the tread heads. The construction of the heads is such as to minimize puncturing and prevent the entrance of water or sand into the tire, and the anchoring links for the washers serve to effectually reinforce the tread elements and to prevent shifting thereof.

In order to afford further security to the support and positioning of the tread elements, a supplemental washer 18 such as shown in Fig. 10 may be employed, this washer being adapted to slip over the inner end of the pin before the convex washer is applied thereto and its outer side is provided with an annular row of spurs or sharpened teeth which are adapted to embed themselves in the leather lining of the tire casing and thus effectually secure the respective tread element from lateral shifting.

I claim as my invention:—

1. The combination with a tire casing, of a plurality of tread elements, each embodying a head, a shank, and a retaining washer, the latter having a ribbed face, the head bearing against the tread of the tire casing, the shank passing through the tire casing, and the washer being disposed within the tire casing, and a cushioning strip confined within the casing and held against the inner face thereof, the cushioning strip being forced by the pressure of the air in the casing against the ribbed face of the washers and in turn holding the latter against the inner face of the casing, the ribs of the washers thereby being anchored in the cushioning strip to prevent side shifting of the tread elements.

2. The combination with a tire casing, of a plurality of tread elements, each embodying a head, a shank and a washer having a ribbed face for engagement in the material of the casing, the shank having a reduced lower end portion affording a stop shoulder, and the washer surrounding the reduced lower end portion bearing against the stop shoulder and being held thereby determinately spaced from the head.

In testimony whereof I have hereunto set my hand in presence of two subscribing witnesses.

CHARLES E. TITUS.

Witnesses:
E. W. PARKER,
F. G. BATES.